(12) United States Patent
Ye

(10) Patent No.: US 10,571,756 B2
(45) Date of Patent: Feb. 25, 2020

(54) LCD PANEL, LCD PANEL MANUFACTURING METHOD AND DISPLAY DEVICE

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Chengliang Ye, Guangdong (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 108 days.

(21) Appl. No.: 16/017,398

(22) Filed: Jun. 25, 2018

(65) Prior Publication Data

US 2019/0243192 A1 Aug. 8, 2019

Related U.S. Application Data

(63) Continuation of application No. PCT/CN2018/079558, filed on Mar. 20, 2018.

(30) Foreign Application Priority Data

Feb. 5, 2018 (CN) .......................... 2018 1 0112261

(51) Int. Cl.
*G02F 1/1343* (2006.01)
*G02F 1/1335* (2006.01)

(52) U.S. Cl.
CPC .... *G02F 1/134336* (2013.01); *G02F 1/13439* (2013.01); *G02F 1/133504* (2013.01);
(Continued)

(58) Field of Classification Search
CPC ......... G02F 1/134336; G02F 1/133504; G02F 1/13439; G02F 2201/123;
(Continued)

(56) References Cited

U.S. PATENT DOCUMENTS 6,992,718 B1 * 1/2006 Takahara ............... G02B 23/14
348/333.09
2004/0212294 A1 * 10/2004 Oda .................. G02F 1/136227
313/498

(Continued)

FOREIGN PATENT DOCUMENTS

| CN | 105789223 A | 7/2016 |
| CN | 205880456 U | 1/2017 |
| CN | 107024796 A | 8/2017 |

*Primary Examiner* — Huyen L Ngo
(74) *Attorney, Agent, or Firm* — Leong C. Lei

(57) ABSTRACT

The invention provides an LCD panel, manufacturing method thereof and display device. The LCD panel comprises an array substrate, the array substrate comprising: a first substrate, a buffer layer, disposed at one side of the first substrate, a first groove being disposed on a surface of the buffer layer away from the first substrate, and first, second, and third pixel electrodes; wherein the first pixel electrode, the second pixel electrode, and the third pixel electrode are successively arranged and insulated from each other, and the first pixel electrode, the second pixel electrode and the third pixel electrodes are all disposed on the surface of the buffer layer away from the first substrate, and the second pixel electrode is disposed in the first groove. The invention improves the transmittance at the same aperture ratio and the display quality for the LCD panel.

15 Claims, 7 Drawing Sheets

(52) U.S. Cl.
CPC ............ *G02F 2001/134381* (2013.01); *G02F 2201/123* (2013.01)

(58) Field of Classification Search
CPC ... G02F 2001/134381; G02F 1/134363; G02F 1/133371
See application file for complete search history.

(56) References Cited

U.S. PATENT DOCUMENTS

| | | | |
|---|---|---|---|
| 2010/0149481 A1* | 6/2010 | Lee .................. | G02F 1/1333 349/187 |
| 2011/0181825 A1* | 7/2011 | Ma .................. | G02F 1/13394 349/155 |
| 2012/0018764 A1* | 1/2012 | Choi .................. | H01L 33/20 257/99 |
| 2016/0155983 A1* | 6/2016 | Lee .................. | H01L 51/5209 257/40 |
| 2017/0307942 A1 | 10/2017 | Lan et al. | |
| 2018/0190631 A1* | 7/2018 | Kim .................. | H01L 25/167 |
| 2019/0013336 A1* | 1/2019 | Zhang .................. | H01L 51/5206 |

\* cited by examiner

LCD PANEL, LCD PANEL MANUFACTURING METHOD AND DISPLAY DEVICE

CROSS REFERENCE TO RELATED APPLICATIONS

This application is a continuing application of PCT Patent Application No. PCT/CN2018/079558, entitled "LCD PANEL, LCD PANEL MANUFACTURING METHOD AND DISPLAY DEVICE", filed on Mar. 20, 2018, which claims priority to Chinese Patent Application No. CN201810112261.0, filed on Feb. 5, 2018, both of which are hereby incorporated in its entireties by reference.

BACKGROUND OF THE INVENTION

1. Field of the Invention

The present invention relates to the field of liquid crystal display (LCD) and, in particular, to the field of a LCD panel, LCD panel manufacturing method and display device.

2. The Related Arts

The liquid crystal display (LCD) provides the advantages of thinness, low power consumption, small radiation, and a soft display screen, and has a wide range of applications. The transmittance ratio is an important indicator of the display quality of the LCD panel. Increasing the transmittance of the LCD can reduce the backlight energy consumption and reduce the cost. In the case of the same backlight, greater brightness can be achieved and the grayscale level can be adjusted more clearly. The major factors that generally affect the transmittance of the LCD panel comprise polarizers, liquid crystal (LC) efficiency, film layer absorption of the array substrate and the color filter substrate, and the aperture ratio of the LCD panel. The LC efficiency refers to the transmittance at the same aperture ratio of the LCD panel. The quality of the LC is closely related to the design of the pixel electrodes. Different pixel electrode designs directly affect the transmittance of the LCD panel.

SUMMARY OF THE INVENTION

The primary object of the present invention is to provide an LCD panel, which comprises an array substrate, and the array substrate comprises:
a first substrate;
a buffer layer, disposed on one side of the first substrate, disposed with a first groove on a surface away from the first substrate;
a first pixel electrode;
a second pixel electrode;
a third pixel electrode; wherein the first pixel electrode, the second pixel electrode, and the third pixel electrode are successively arranged and insulated from each other, and the first pixel electrode, the second pixel electrode and the third pixel electrodes are all disposed on the surface of the buffer layer away from the first substrate, and the second pixel electrode is disposed in the first groove.

Compared to the known technology, the LCD panel provided by the present invention comprises an array substrate, the array substrate comprises a first substrate, a buffer layer disposed on one side of the first substrate, and a first groove disposed on a surface of the buffer layer away from the first substrate; a first pixel electrode; a second pixel electrode; a third pixel electrode; the first pixel electrode, the second pixel electrode, and the third pixel electrode being successively arranged and insulated from each other, and the first pixel electrode, the second pixel electrode and the third pixel electrodes being all disposed on a surface of the buffer layer away from the first substrate, and the second pixel electrode being disposed in the first groove. Since the first pixel electrode, the second pixel electrode and the third pixel electrode are successively and sequentially arranged and insulated from each other and the second pixel electrode is disposed in the first groove, the first pixel electrode, the second pixel electrode, and the third pixel electrode form a curved surface with concave and convex, so that the electric field at the interface between the adjacent pixel electrodes is improved, and the electric field in the lateral direction can be increased, and the orientation angle of the liquid crystal can be pushed. The transmittance of the LCD panel at the same aperture ratio is improved, and the display effect of the LCD panel is also improved. Furthermore, the greater the extent of undulation from the first pixel electrode, the second pixel electrode and the third pixel electrode, the stronger the lateral electric field will be, and the better the liquid crystal is oriented, and thus the transmittance of the LCD panel at the same aperture ratio can be more significantly improved.

The present invention also provides an LCD panel manufacturing method, which comprises:
providing a first substrate;
forming a buffer layer to cover a side of the first substrate;
forming a first groove on a surface of the buffer layer away from the first substrate;
forming a first pixel electrode, a second pixel electrode, and a third pixel electrode; the first pixel electrode, the second pixel electrode, and the third pixel electrode being successively arranged and insulated from each other, and the first pixel electrode, the second pixel electrode and the third pixel electrodes being all disposed on a surface of the buffer layer away from the first substrate, and the second pixel electrode being disposed in the first groove; wherein the first substrate, the buffer layer, the first pixel electrode, the second pixel electrode, and the third pixel electrode together forming an array substrate of an LCD panel.

The present invention also provides a display device, and the display device comprises the aforementioned LCD panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

The terms "comprising" and "having" and any variations thereof appearing in the specification, claims, and drawings of the present application are intended to cover non-exclusive inclusion. For example, a process, method, system, product, or device that includes a series of steps or units is not limited to the listed steps or units, but optionally also includes steps or units not listed, or alternatively, other steps or units inherent to these processes, methods, products or equipment. In addition, the terms "first", "second" and "third" are used to distinguish different objects and not intended to describe a particular order.

Figure 1:
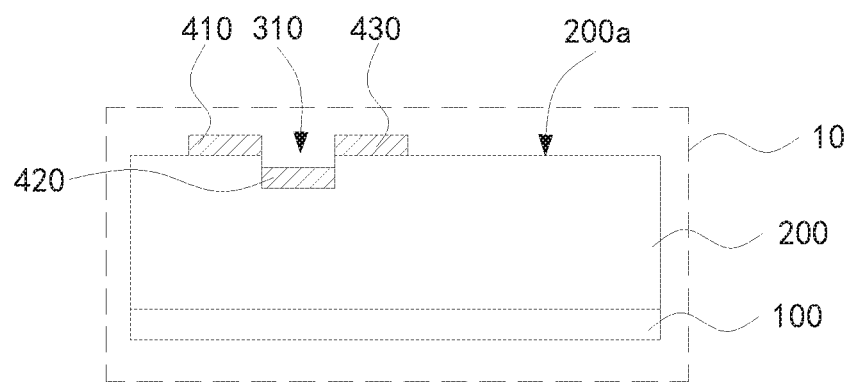
FIG. 1 is a schematic view showing the structure of an LCD panel provided by the first embodiment of the present invention.

As shown in FIG. 1, FIG. 1 is a schematic view showing the structure of an LCD panel provided by the first embodiment of the present invention. The LCD panel 1 comprises an array substrate 10, and the array substrate 10 comprises:

a first substrate 100;

a buffer layer 200, disposed on one side of the first substrate 100, disposed with a first groove 310 on a surface 200a away from the first substrate 100;

a first pixel electrode 410;

a second pixel electrode 420;

a third pixel electrode 430; wherein the first pixel electrode 410, the second pixel electrode 420, and the third pixel electrode 430 are successively arranged and insulated from each other, and the first pixel electrode 410, the second pixel electrode 420 and the third pixel electrodes 430 are all disposed on the surface of the buffer layer 200 away from the first substrate 100, and the second pixel electrode 420 is disposed in the first groove 310.

Optionally, the first substrate 100 may be a flexible substrate, and the flexible substrate may be, but is not limited to, a composite of a polyimide (PI) film or a polyester film and a copper foil. Due to the high-temperature durability and solderability, high strength, high modulus, flame retardancy, and other excellent properties of PI, PI as a polymer material has outstanding thermal stability, good radiation resistance and chemical stability, and excellent mechanical properties.

Optionally, the first pixel electrode 410, the second pixel electrode 420, and the third pixel electrode 430 may be made of a transparent conductive material, which may be, but is not limited to, indium tin oxide (ITO). ITO has excellent electrical conductivity and optical transparency, and is widely used in the production of LCDs, flat panel displays, plasma displays, touch screens, electronic paper, organic light emitting diodes (OLDE), and solar cells, antistatic coatings, and transparent conductive coating with electromagnetic interference (EMI) mask.

The surface 200a of the buffer layer 200 away from the first substrate 100 is disposed with the first groove 310. the first pixel electrode 410, the second pixel electrode 420, and the third pixel electrode 430 are successively arranged and insulated from each other, and the first pixel electrode 410, the second pixel electrode 420 and the third pixel electrodes 430 are all disposed on the surface of the buffer layer 200 away from the first substrate 100, and the second pixel electrode 420 is disposed in the first groove 310. Because the first pixel electrode 410, the second pixel electrode 420, and the third pixel electrode 430 are successively arranged and insulated from each other, and the second pixel electrode 420 is disposed in the first groove 310, the first pixel electrode 410, the second pixel electrode 420, and the third pixel electrode 430 form a curved surface with concave and convex, so that the electric field at the interface between the adjacent pixel electrodes is improved, and the electric field in the lateral direction can be increased, and the orientation angle of the liquid crystal can be pushed. The transmittance of the LCD panel 1 at the same aperture ratio is improved, and the display effect of the LCD panel 1 is also improved. Furthermore, the greater the extent of undulation from the first pixel electrode 410, the second pixel electrode 420 and the third pixel electrode 430, the stronger the lateral electric field will be, and the better the liquid crystal is oriented, and thus the transmittance of the LCD panel 1 at the same aperture ratio can be more significantly improved.

The LCD panel provided by the present invention comprises an array substrate, the array substrate comprises a first substrate, a buffer layer disposed on one side of the first substrate, and a first groove disposed on a surface of the buffer layer away from the first substrate; a first pixel electrode; a second pixel electrode; a third pixel electrode; the first pixel electrode, the second pixel electrode, and the third pixel electrode being successively arranged and insulated from each other, and the first pixel electrode, the second pixel electrode and the third pixel electrodes being all disposed on a surface of the buffer layer away from the first substrate, and the second pixel electrode being disposed in the first groove. Since the first pixel electrode, the second pixel electrode and the third pixel electrode are successively and sequentially arranged and insulated from each other and the second pixel electrode is disposed in the first groove, the first pixel electrode, the second pixel electrode, and the third pixel electrode form a curved surface with concave and convex, so that the electric field at the interface between the adjacent pixel electrodes is improved, and the electric field in the lateral direction can be increased, and the orientation angle of the liquid crystal can be pushed. The transmittance of the LCD panel at the same aperture ratio is improved, and the display effect of the LCD panel is also improved. Furthermore, the greater the extent of undulation from the first pixel electrode, the second pixel electrode and the third pixel electrode, the stronger the lateral electric field will be, and the better the liquid crystal is oriented, and thus the transmittance of the LCD panel at the same aperture ratio can be more significantly improved.

Figure 2:
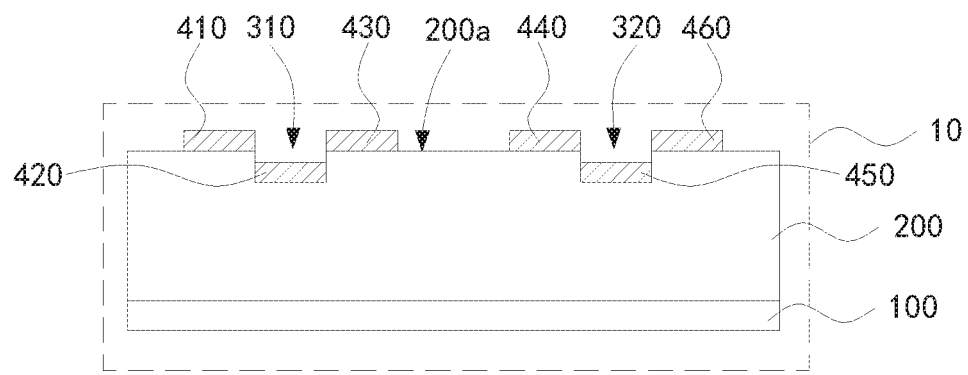
FIG. 2 is a schematic view showing the structure of an LCD panel provided by the second embodiment of the present invention.

Refer to FIG. 2. FIG. 2 is a schematic view showing the structure of an LCD panel provided by the second embodiment of the present invention. The second embodiment is similar to the first embodiment, with the difference in: in the second embodiment, the array substrate 10 further comprises: a fourth pixel electrode 440, a fifth pixel electrode 450, and a sixth pixel electrode 460; a second groove 320 disposed on the surface 200a of the buffer layer 200 away from the first substrate 100; wherein the fourth pixel electrode 440, the fifth pixel electrode 450, and the sixth pixel electrode 460 are successively arranged and insulated from each other, and the fourth pixel electrode 440, the fifth pixel electrode 450, and the sixth pixel electrodes 460 all disposed on the surface of the buffer layer 200 away from the first substrate 100, with the fourth pixel electrode 440 disposed adjacent to the third pixel electrode 430, and the fifth pixel electrode 450 disposed inside the second groove 320.

Optionally, in an embodiment, the distance d between the third pixel electrode 430 and the fourth pixel electrode 440 is less than a default distance D.

Specifically, denoting the maximum distance between the third pixel electrode 430 and the fourth pixel electrode 440 as d, when the maximum distance d between the third pixel electrode 430 and the fourth pixel electrode 440 is less than the default distance value D, the distance between the third pixel electrode 430 and the fourth pixel electrode 440 is small. In this case, the diffraction effect is more significant, and the light can more easily penetrate the first pixel electrode 410, the second pixel electrode 420, the third pixel electrode 430, the fourth pixel electrode 440, the fifth pixel electrode 450 and the sixth pixel electrode 460. Therefore, the present invention improves the transmittance of the LCD panel 1 and improves the LC efficiency. Furthermore, the smaller the distance between the third pixel electrode 430 and the fourth pixel electrode 440 is, the stronger the lateral electric field will be, and the less likely the dark pattern will form in the region between the third pixel electrode 430 and the fourth pixel electrode 440.

Optionally, the width d1 of the first groove 310 and the width d2 of the second groove 320 are less than the first default width value K1, and the width d1 of the first groove and the width of the second groove d2 is smaller than the distance D between the third pixel electrode 430 and the fourth pixel electrode 440.

Wherein, the width d1 of the first groove 310 and the width d2 of the second groove 320 can be the same or different.

Specifically, denoting the maximum width of the first groove 310 as d1, and the maximum width of the second groove 320 as d2, when both the width d1 of the first groove 310 and the width d2 of the second groove 320 are smaller than the first default width K1, both the width d1 of the first groove 310 and the width d2 of the second groove 320 are considered as small, which means that both the first groove 310 and the second groove 320 are narrow. At the same time, the first width d1 of the first groove 310 and the width d2 of the second groove 320 are smaller than the distance D between the third pixel electrode 430 and the fourth pixel electrode 440. In this case, the diffraction effect is more significant, and the light can easily penetrate first pixel electrode 410, the second pixel electrode 420, the third pixel electrode 430, the fourth pixel electrode 440, the fifth pixel electrode 450 and the sixth pixel electrode 460. Specifically, the approach to manufacture narrower the first groove 310 and the second groove 320 is as follows: when performing mask manufacturing, a gap is increased on the first pixel electrode 410, the third pixel electrode 430, the fourth pixel electrode 440 and the sixth pixel electrode 460. The principle of grating diffraction is used to make the first groove 310 and the second groove 320 become narrower. By exposing the small-pitch photoresist between the third pixel electrode 430 and the fourth pixel electrode 440, thereby reducing the volume of the third pixel electrode 430 and the fourth pixel electrode 440, the transmittance of the LCD panel 1 is increased. Therefore, the present invention improves the transmittance of the LCD panel 1 and improves the LC efficiency. Furthermore, the smaller the distance between the third pixel electrode 430 and the fourth pixel electrode 440 is, the stronger the lateral electric field will be, and the less likely the dark pattern will form in the region between the third pixel electrode 430 and the fourth pixel electrode 440.

Optionally, the first pixel electrode 410, the third pixel electrode 430, the fourth pixel electrode 440 and the sixth pixel electrode 460 all have a strip shape, and the width of the first pixel electrode 410 and the width of the third pixel electrode 430 are both less than a second default width K2; the width of the fourth pixel electrode 440 and the width of the sixth pixel electrode 460 are both less than a third default width K3.

Specifically, denoting the maximum width of the first pixel electrode 410 as L1, the maximum width of the third pixel electrode 430 as L3, the maximum width of the fourth pixel electrode 410 as L4, and the maximum width of 460 as L6 respectively, when the maximum width L1 of the first pixel electrode 410 and the maximum width L3 of the third pixel electrode 430 are both less than the second default width K2, and the maximum width L4 of the fourth pixel electrode 440 and the maximum width L6 of the sixth pixel electrode 460 are both less than the third default width K3, the diffraction effect is more significant, and the light can more easily penetrate the first pixel electrode 410, the second pixel electrode 420, the third pixel electrode 430, the fourth pixel electrode 440, the fifth pixel electrode 450 and the sixth pixel electrode 460. Therefore, the present invention improves the transmittance of the LCD panel 1 and improves the LC efficiency. Furthermore, the smaller the distance between the third pixel electrode 430 and the fourth pixel electrode 440 is, the stronger the lateral electric field will be, and the less likely the dark pattern will form in the region between the third pixel electrode 430 and the fourth pixel electrode 440.

In other words, in principle, the smaller the widths of the first pixel electrode 410 and the third pixel electrode 430 are, the smaller the widths of the fourth pixel electrode 440 and the sixth pixel electrode 460 are, narrower the first pixel electrode 410, the third pixel electrode 430, the fourth pixel electrode 440 and the sixth pixel electrode 460 are. In such case, the more prominent the diffraction effect will be, and the easier to make the distance between the third pixel electrode 430 and the fourth pixel electrode 440 to reach the target value is. Optionally, the distance between the third pixel electrode 430 and the fourth pixel electrode 440 is mainly determined by the minimum pitch accuracy of a photomask or a mask manufacturer. In principle, the smaller the distance between the third pixel electrode 430 and the fourth pixel electrode 440 is, the better the performance is. Specifically, when performing mask manufacturing, a gap is increased on the first pixel electrode 410, the third pixel electrode 430, the fourth pixel electrode 440 and the sixth pixel electrode 460. The principle of grating diffraction is used to make the first groove 310 and the second groove 320 become narrower. By exposing the small-pitch photoresist between the third pixel electrode 430 and the fourth pixel electrode 440, thereby reducing the volume of the third pixel electrode 430 and the fourth pixel electrode 440, the transmittance of the LCD panel 1 is increased.

Figure 3:
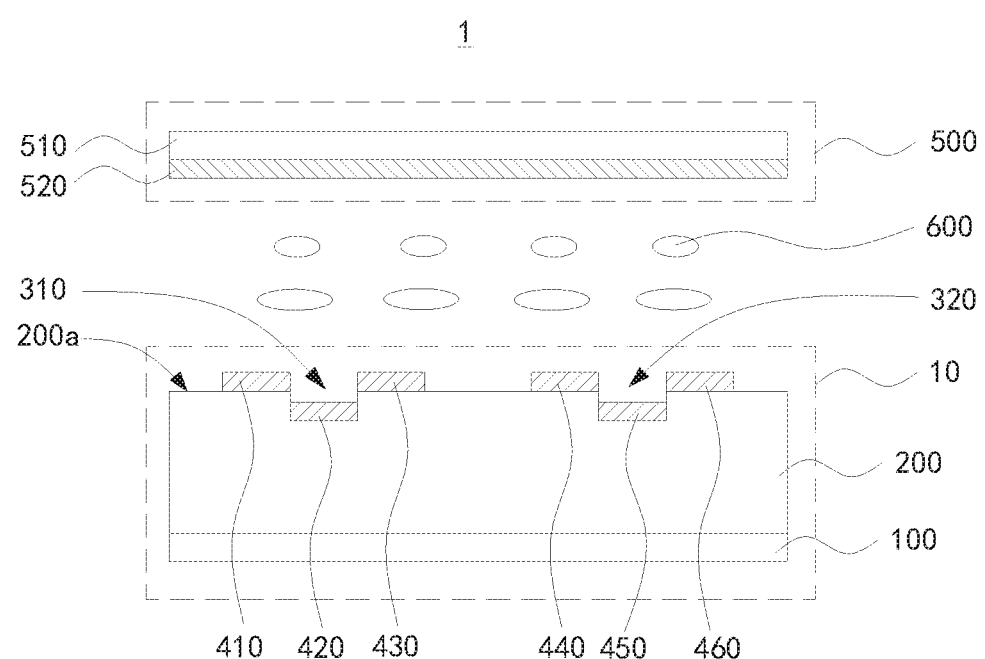
FIG. 3 is a schematic view showing the structure of an LCD panel provided by the third embodiment of the present invention.

Refer to FIG. 3. FIG. 3 is a schematic view showing the structure of an LCD panel provided by the third embodiment of the present invention. The third embodiment is similar to the second embodiment, with the difference as follows. In the third embodiment, the LCD panel 1 further comprises a color filter (CF) substrate 500 and a liquid crystal (LC) layer 600. The CF substrate 500 is disposed at the side of the first substrate 100 adjacent to the buffer layer 200 and is with an interval from the first substrate 100;

The CF substrate 500 comprises a second substrate 510 and a common electrode 520, the common electrode 520 is disposed on the surface 200a of the second substrate 510 adjacent to the buffer layer 200;

The LC layer 600 is disposed between the array substrate 10 and the CF substrate 500.

Wherein, the first pixel electrode 410, the second pixel electrode 420, the third pixel electrode 430, the fourth pixel electrode 440, the fifth pixel electrode 450, the sixth pixel electrode 460, and the common electrode 520 collaborate to achieve the tilting control of the LC layer 600, so as to control the light-emission of the LCD panel 1 to realize the display of the LCD panel 1.

The LCD panel provided by the present invention comprises an array substrate, the array substrate comprises a first substrate, a buffer layer disposed on one side of the first substrate, and a first groove disposed on a surface of the buffer layer away from the first substrate; a first pixel electrode; a second pixel electrode; a third pixel electrode; the first pixel electrode, the second pixel electrode, and the third pixel electrode being successively arranged and insulated from each other, and the first pixel electrode, the second pixel electrode and the third pixel electrodes being all disposed on a surface of the buffer layer away from the first substrate, and the second pixel electrode being disposed in the first groove. Since the first pixel electrode, the second pixel electrode and the third pixel electrode are successively and sequentially arranged and insulated from each other and the second pixel electrode is disposed in the first groove, the first pixel electrode, the second pixel electrode, and the third pixel electrode form a curved surface with concave and convex, so that the electric field at the interface between the adjacent pixel electrodes is improved, and the electric field in the lateral direction can be increased, and the orientation angle of the liquid crystal can be pushed. The transmittance of the LCD panel at the same aperture ratio is improved, and the display effect of the LCD panel is also improved. Furthermore, the greater the extent of undulation from the first pixel electrode, the second pixel electrode and the third pixel electrode, the stronger the lateral electric field will be, and the better the liquid crystal is oriented, and thus the transmittance of the LCD panel at the same aperture ratio can be more significantly improved.

Figure 4:
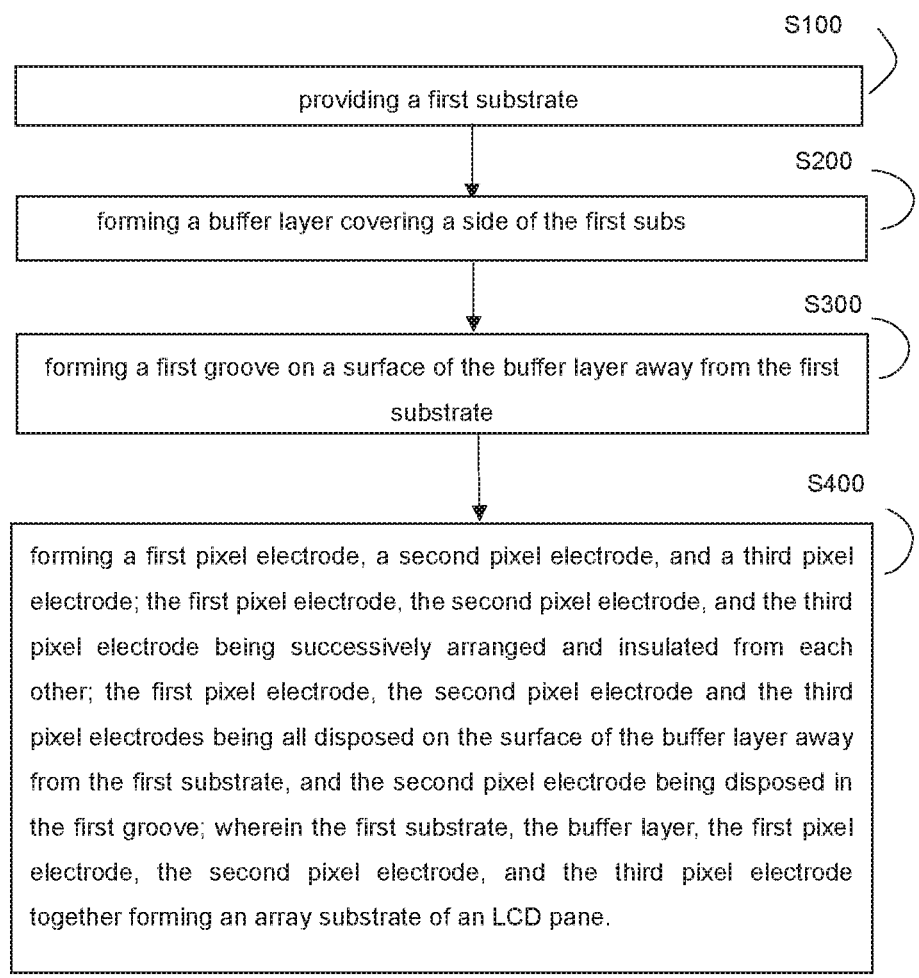
FIG. 4 is a flowchart showing an LCD panel manufacturing method provided by the first embodiment of the present invention.

Refer to FIG. 4. FIG. 4 is a flowchart showing an LCD panel manufacturing method provided by the first embodiment of the present invention.

The LCD panel manufacturing method comprises, but is not limited to, the following steps S100, S200, S300, and S400. The steps S100, S200, S300, and S400 are described in details as follows.

S100: providing a first substrate 100.

Optionally, the first substrate 100 may be a flexible substrate, and the flexible substrate may be, but is not limited to, a composite of a polyimide (PI) film or a polyester film and a copper foil. Due to the high-temperature durability and solderability, high strength, high modulus, flame retardancy, and other excellent properties of PI, PI as a polymer material has outstanding thermal stability, good radiation resistance and chemical stability, and excellent mechanical properties.

S200: forming a buffer layer 200 to cover a side of the first substrate 100.

Wherein, the buffer layer 200 is to protect the first substrate 100.

S300: forming a first groove 310 on a surface 200a of the buffer layer 200 away from the first substrate 100.

S400: forming a first pixel electrode 410, a second pixel electrode 420, and a third pixel electrode 430; the first pixel electrode 410, the second pixel electrode 420, and the third pixel electrode 430 being successively arranged and insulated from each other, and the first pixel electrode 410, the second pixel electrode 420 and the third pixel electrodes 430 being all disposed on the surface 200a of the buffer layer 200 away from the first substrate 100, and the second pixel electrode 420 being disposed in the first groove 310; wherein the first substrate 100, the buffer layer 200, the first pixel electrode 410, the second pixel electrode 420, and the third pixel electrode 430 together forming an array substrate 10 of an LCD panel 1.

Specifically, in an embodiment, the process to form the first pixel electrode 410, the second pixel electrode 420, and the third pixel electrode 430 is: forming a first transparent conductive layer on the surface 200a of the buffer layer 200 away from the first substrate 100; patterning the first transparent conductive layer to form the first pixel electrode 410, the second pixel electrode 420, and the third pixel electrode 430.

Optionally, the first pixel electrode 410, the second pixel electrode 420, and the third pixel electrode 430 may be made of a transparent conductive material, which may be, but is not limited to, indium tin oxide (ITO). ITO has excellent electrical conductivity and optical transparency, and is widely used in the production of LCDs, flat panel displays, plasma displays, touch screens, electronic paper, organic light emitting diodes (OLDE), and solar cells, antistatic coatings, and transparent conductive coating with electromagnetic interference (EMI) mask.

Figure 5:
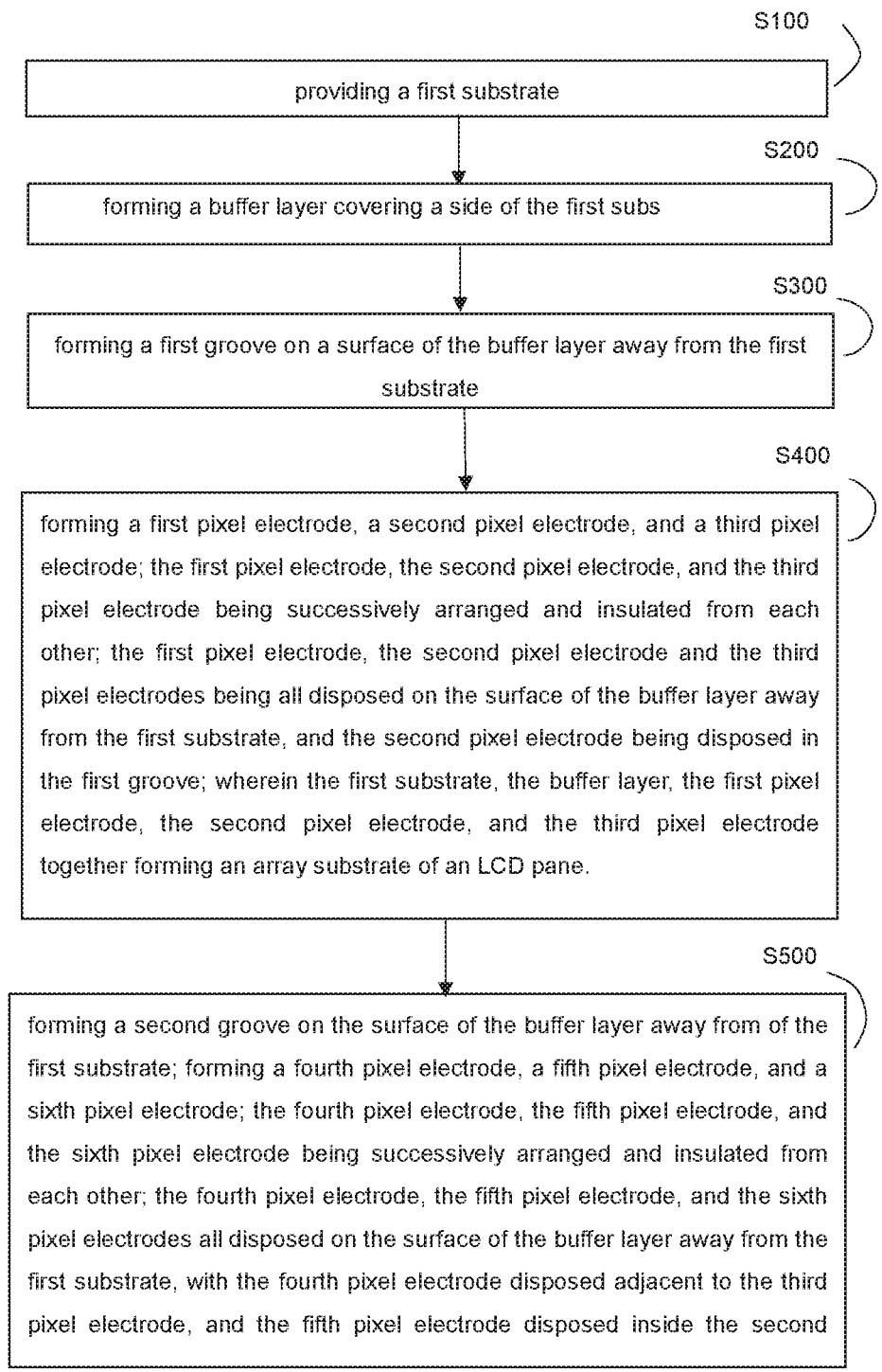
FIG. 5 is a flowchart showing an LCD panel manufacturing method provided by the second embodiment of the present invention.

Refer to FIG. 5. FIG. 5 is a flowchart showing an LCD panel manufacturing method provided by the second embodiment of the present invention. In addition to steps S100, S200, S300, and S400, the LCD panel manufacturing method further comprises, but is not limited to, a step S500. The details of steps S100, S200, S300, and S400 are not repeated here. The details of step S500 are described as follows.

S500: forming a fourth pixel electrode 440, a fifth pixel electrode 450, and a sixth pixel electrode 460; the fourth pixel electrode 440, the fifth pixel electrode 450, and the sixth pixel electrode 460 being successively arranged and insulated from each other, and the fourth pixel electrode 420, the fifth pixel electrode 450 and the sixth pixel electrodes 460 being all disposed on the surface 200a of the buffer layer 200 away from the first substrate 100, the fourth pixel electrode 440 being disposed near the third pixel electrode 430, and the fifth pixel electrode 450 being disposed in a second groove 320.

In an embodiment, the second groove 320 and the first groove 310 are formed in the same process.

In an embodiment, the process to form the fourth pixel electrode 440, the fifth pixel electrode 450, and the sixth pixel electrode 460 is: forming a second transparent conductive layer on the surface 200a of the buffer layer 200 away from the first substrate 100; patterning the second transparent conductive layer to form the fourth pixel electrode 440, the fifth pixel electrode 450, and the sixth pixel electrode 460.

In another embodiment, the first pixel electrode 410, the second pixel electrode 420, the third pixel electrode 430, the fourth pixel electrode 440, the fifth pixel electrode 450, and the sixth pixel electrode 460 are all formed in the same process. Specifically, the process comprises: forming an entire transparent conductive layer on the surface 200*a* of the buffer layer 200 away from the first substrate 100; patterning the entire transparent conductive layer to form the first pixel electrode 410, the second pixel electrode 420, the third pixel electrode 430, the fourth pixel electrode 440, the fifth pixel electrode 450, and the sixth pixel electrode 460.

Figure 6:
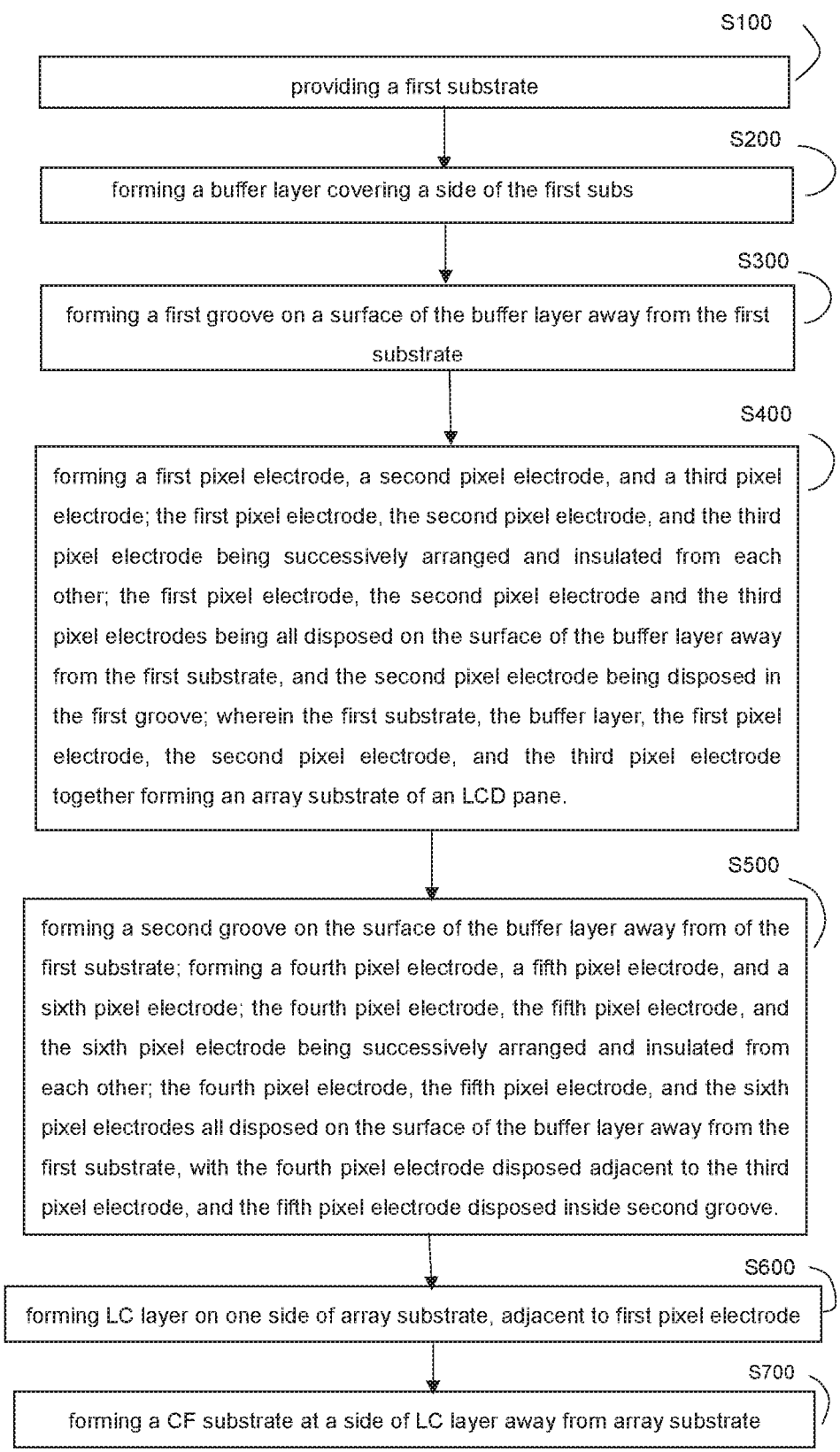
FIG. 6 is a flowchart showing an LCD panel manufacturing method provided by the third embodiment of the present invention.

Refer to FIG. 6. FIG. 6 is a flowchart showing an LCD panel manufacturing method provided by the third embodiment of the present invention. In addition to steps S100, S200, S300, S400, and S500, the LCD panel manufacturing method further comprises, but is not limited to, steps S600 and S700. The details of steps S100, S200, S300, S400 and S500 are not repeated here. The details of steps S600 and S700 are described as follows.

S600: forming an liquid crystal (LC) layer 600 on one side of the array substrate 10, the LCD layer 600 being adjacent to the first pixel electrode 410.

Wherein, the first pixel electrode 410, the second pixel electrode 420, the third pixel electrode 430, the fourth pixel electrode 440, the fifth pixel electrode 450, the sixth pixel electrode 460, and the common electrode 520 collaborate to achieve the tilting control of the LC layer 600, so as to control the light-emission of the LCD panel 1 to realize the display of the LCD panel 1.

S700: forming a color filter (CF) substrate 500, disposed at a side of the LC layer 600 away from the array substrate 100.

Figure 7:
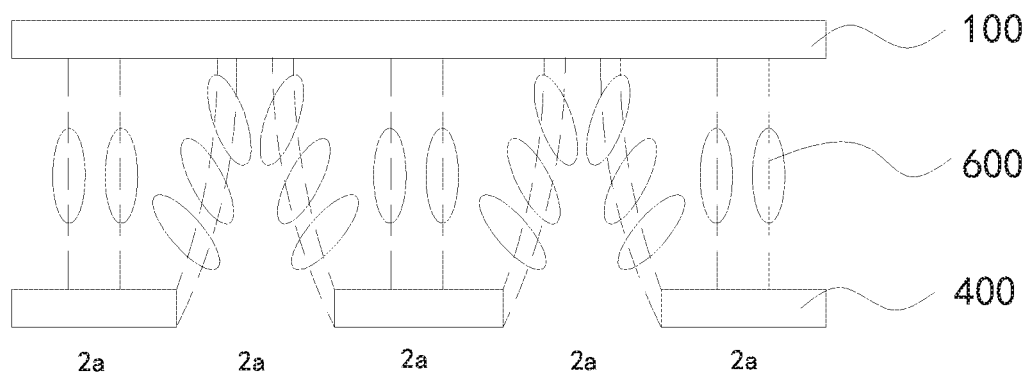
FIGS. 7(a)-7(c) are schematic views showing the operational principle of an LCD panel provided by the present invention.
Figure 7:
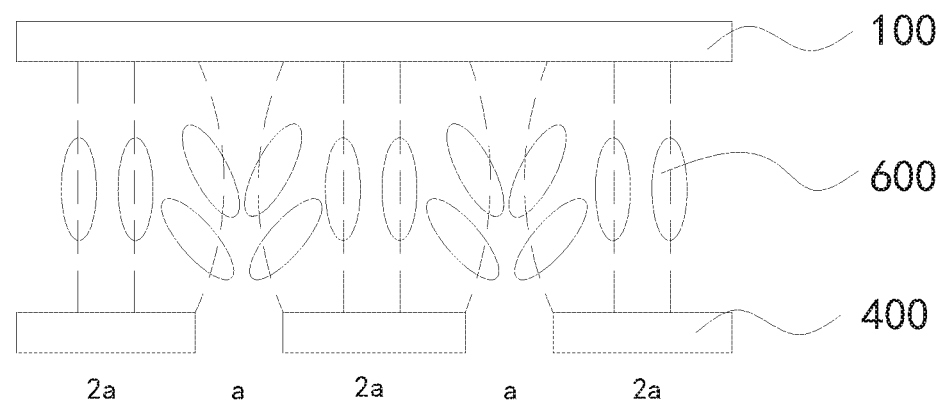
Figure 7:
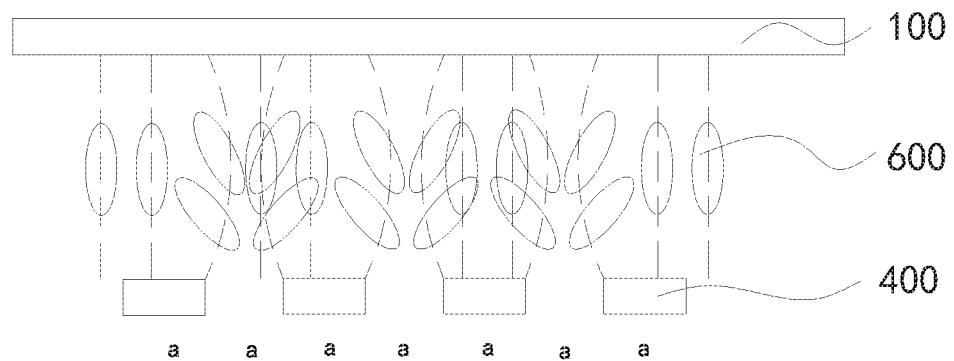

Refer to FIGS. 7(*a*)-7(*c*). FIGS. 7(*a*)-7(*c*) are schematic views showing the operational principle of an LCD panel provided by the present invention. The operating principle of the LCD is as follows: first, referring to FIGS. 7(*a*) and 7(*b*), when the pixel electrodes 400 have the same width and all being 2a, the smaller the width of the grooves, the stronger the lateral electric field is, and the orientation angle of the LC layer 600 is pushed so that the transmittance of the LCD panel at the same aperture ratio is increased and display effect of the LCD panel is improved. Furthermore, when the width of the groove is smaller, the stronger the electric field at the intersection of the neighboring pixel electrodes 400 is, and the more significant the diffraction effect will be. As such, the dark pattern is less likely to occur in the region of the groove, so that the transmittance at the same opening ratio of the LCD panel can be improved. Then, referring to FIGS. 7(*b*) and 7(*c*), when the widths of the grooves are the same, the smaller the width of the pixel electrodes 400, the more pixel electrodes 400 can be placed in the same area. the stronger the lateral electric field is, and the orientation angle of the LC layer 600 is pushed so that the transmittance of the LCD panel at the same aperture ratio is increased and display effect of the LCD panel is improved.

Figure 8:
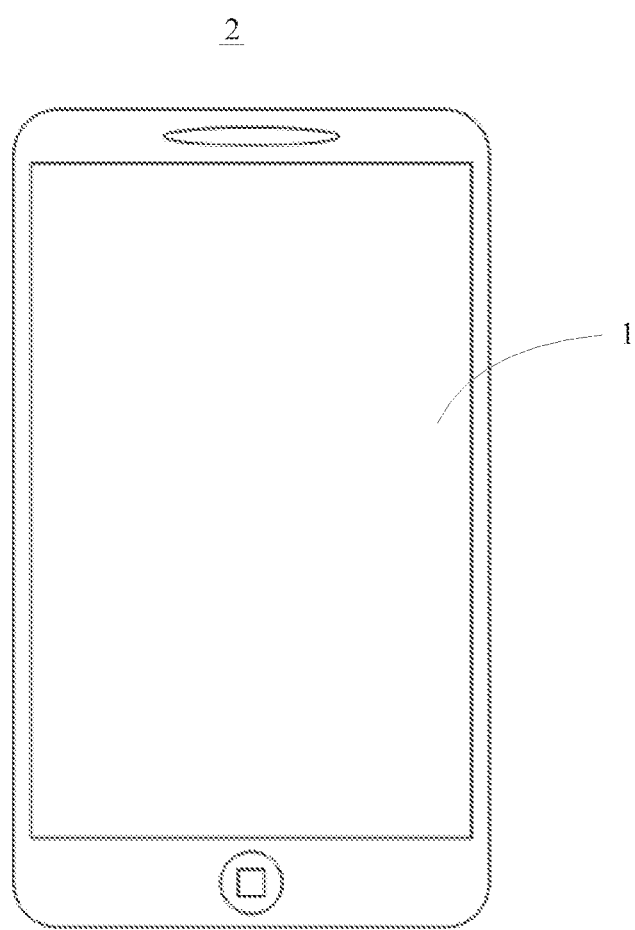
FIG. 8 is a schematic view showing the structure of a display device provided by a preferred embodiment of the present invention.

Refer to FIG. 8. FIG. 8 is a schematic view showing the structure of a display device provided by a preferred embodiment of the present invention. The display device 2 comprises an LCD panel 1, and the LCD panel 1 is the LCD panel 1 provided in any of the foregoing embodiments, which will not be described herein. The display device 2 may be, but is not limited to, an e-book, a smart phone (such as, an Android mobile phone, an iOS mobile phone, a Windows Phone mobile phone, and so on), a digital television, a tablet computer, a palmtop computer, a notebook computer, a mobile Internet device (MID), wearable devices, and so on.

It should be noted that each of the embodiments in this specification is described in a progressive manner, each of which is primarily described in connection with other embodiments with emphasis on the difference parts, and the same or similar parts may be seen from each other. For the device embodiment, since it is substantially similar to the method embodiment, the description is relatively simple and the relevant description may be described in part of the method embodiment.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display (LCD) panel, comprising an array substrate, and the array substrate comprising:
    a first substrate;
    a buffer layer, disposed at one side of the first substrate, a first groove being disposed on a surface of the buffer layer away from the first substrate;
    a first pixel electrode;
    a second pixel electrode;
    a third pixel electrode; wherein the first pixel electrode, the second pixel electrode, and the third pixel electrode being successively arranged and insulated from each other; the first pixel electrode, the second pixel electrode and the third pixel electrodes being all disposed on the surface of the buffer layer away from the first substrate, and the second pixel electrode being disposed in the first groove.

2. The LCD panel as claimed in claim 1, wherein the array substrate further comprises:
    a fourth pixel electrode, a fifth pixel electrode, and a sixth pixel electrode; a second groove being disposed on the surface of the buffer layer away from of the first substrate; the fourth pixel electrode, the fifth pixel electrode, and the sixth pixel electrode being successively arranged and insulated from each other, the fourth pixel electrode, the fifth pixel electrode, and the sixth pixel electrodes all disposed on the surface of the buffer layer away from the first substrate, with the fourth pixel electrode disposed adjacent to the third pixel electrode, and the fifth pixel electrode disposed inside the second groove.

3. The LCD panel as claimed in claim 2, wherein distance between the third pixel electrode and the fourth pixel electrode is smaller than a default distance.

4. The LCD panel as claimed in claim 2, wherein width of the first groove and width of the second groove are both smaller than a first default width; and the width of the first groove and the width of the second groove are both smaller than distance between the third pixel electrode and the fourth pixel electrode.

5. The LCD panel as claimed in claim 2, wherein the first pixel electrode, the third pixel electrode, the fourth pixel electrode and the sixth pixel electrode all have a strip shape, and width of the first pixel electrode and width of the third pixel electrode are both less than a second default width; width of the fourth pixel electrode and width of the sixth pixel electrode are both less than a third default width.

6. The LCD panel as claimed in claim 1, further comprising: a color filter (CF) substrate and a liquid crystal (LC) layer; the CF substrate being disposed at a side of the first substrate adjacent to the buffer layer, and separated from the first substrate with an interval;

the CF substrate comprising a second substrate and a common electrode; the common electrode being disposed on a surface of the second substrate adjacent to the buffer layer;

the LC layer being disposed between the array substrate and the CF substrate.

7. A liquid crystal display (LCD) panel manufacturing method, comprising:

providing a first substrate;

forming a buffer layer covering a side of the first substrate;

forming a first groove on a surface of the buffer layer away from the first substrate;

forming a first pixel electrode, a second pixel electrode, and a third pixel electrode; the first pixel electrode, the second pixel electrode, and the third pixel electrode being successively arranged and insulated from each other; the first pixel electrode, the second pixel electrode and the third pixel electrodes being all disposed on the surface of the buffer layer away from the first substrate, and the second pixel electrode being disposed in the first groove; wherein the first substrate, the buffer layer, the first pixel electrode, the second pixel electrode, and the third pixel electrode together forming an array substrate of an LCD pane.

8. The LCD panel manufacturing method as claimed in claim 7, further comprising:

forming a second groove on the surface of the buffer layer away from of the first substrate; forming a fourth pixel electrode, a fifth pixel electrode, and a sixth pixel electrode; the fourth pixel electrode, the fifth pixel electrode, and the sixth pixel electrode being successively arranged and insulated from each other; the fourth pixel electrode, the fifth pixel electrode, and the sixth pixel electrodes all disposed on the surface of the buffer layer away from the first substrate, with the fourth pixel electrode disposed adjacent to the third pixel electrode, and the fifth pixel electrode disposed inside the second groove.

9. The LCD panel manufacturing method as claimed in claim 7, further comprising:

forming a liquid crystal (LC) layer on one side of the array substrate, the LCD layer being adjacent to the first pixel electrode;

forming a color filter (CF) substrate, disposed at a side of the LC layer away from the array substrate.

10. A display device, comprising a liquid crystal display (LCD) panel, the LCD panel comprising an array substrate, and the array substrate comprising:

a first substrate;

a buffer layer, disposed at one side of the first substrate, a first groove being disposed on a surface of the buffer layer away from the first substrate;

a first pixel electrode;

a second pixel electrode;

a third pixel electrode; wherein the first pixel electrode, the second pixel electrode, and the third pixel electrode being successively arranged and insulated from each other; the first pixel electrode, the second pixel electrode and the third pixel electrodes being all disposed on the surface of the buffer layer away from the first substrate, and the second pixel electrode being disposed in the first groove.

11. The display device as claimed in claim 10, wherein the array substrate further comprises:

a fourth pixel electrode, a fifth pixel electrode, and a sixth pixel electrode; a second groove being disposed on the surface of the buffer layer away from of the first substrate; the fourth pixel electrode, the fifth pixel electrode, and the sixth pixel electrode being successively arranged and insulated from each other the fourth pixel electrode, the fifth pixel electrode, and the sixth pixel electrodes all disposed on the surface of the buffer layer away from the first substrate, with the fourth pixel electrode disposed adjacent to the third pixel electrode, and the fifth pixel electrode disposed inside the second groove.

12. The display device as claimed in claim 11, wherein distance between the third pixel electrode and the fourth pixel electrode is smaller than a default distance.

13. The display device as claimed in claim 11, wherein width of the first groove and width of the second groove are both smaller than a first default width; and the width of the first groove and the width of the second groove are both smaller than distance between the third pixel electrode and the fourth pixel electrode.

14. The display device as claimed in claim 11, wherein the first pixel electrode, the third pixel electrode, the fourth pixel electrode and the sixth pixel electrode all have a strip shape, and width of the first pixel electrode and width of the third pixel electrode are both less than a second default width; width of the fourth pixel electrode and width of the sixth pixel electrode are both less than a third default width.

15. The display as claimed in claim 10, wherein the LCD panel further comprises: a color filter (CF) substrate and a liquid crystal (LC) layer; the CF substrate being disposed at a side of the first substrate adjacent to the buffer layer, and separated from the first substrate with an interval;

the CF substrate comprising a second substrate and a common electrode; the common electrode being disposed on a surface of the second substrate adjacent to the buffer layer;

the LC layer being disposed between the array substrate and the CF substrate.

* * * * *